April 27, 1937.　　　F. D. CHAPMAN　　　2,078,235

HYDRAULIC APPARATUS

Filed Aug. 5, 1935　　　2 Sheets-Sheet 1

INVENTOR.
F. D. Chapman
BY
Morsell, Lieber & Morsell
ATTORNEYS.

April 27, 1937.  F. D. CHAPMAN  2,078,235
HYDRAULIC APPARATUS
Filed Aug. 5, 1935   2 Sheets-Sheet 2

INVENTOR.
F. D. Chapman
BY
Morsell, Lieber & Morsell
ATTORNEYS.

Patented Apr. 27, 1937

2,078,235

UNITED STATES PATENT OFFICE 2,078,235

HYDRAULIC APPARATUS

Frank D. Chapman, Berlin, Wis.

Application August 5, 1935, Serial No. 34,740

7 Claims. (Cl. 302—14)

The present invention relates in general to improvements in the art of transporting and otherwise treating granular materials, and relates more specifically to improved apparatus for hydraulically conveying granular substances such as peas, and for simultaneously conditioning the product during such conveyance thereof.

Generally defined, an object of the invention is to provide an improved system for hydraulically transporting and for simultaneously thoroughly cleansing materials, such as green peas, in a most effective manner and without damaging the product.

While it has heretofore been proposed to convey green peas from one place to another by injecting the peas into a confined stream of water, these prior systems did not function effectively and without undesirably mashing and damaging the relatively soft product. It was heretofore deemed impossible to pass products such as peas directly through the impelling rotor of a hydraulic pump; and the prior hydraulic conveying systems therefore avoided placing the pump directly in the path of transportation of the material, by merely utilizing the pump to inject a jet of water at high velocity into a conduit or pipe and by delivering the granular product into the stream beyond the discharge end of the pump. This admission of the relatively soft peas to a rapidly flowing stream resulted in impact sufficient to produce considerable damage, and also placed serious limitations upon the quantity of peas which could be admitted and transported. The prior systems also embodied other objectionable features such as excessive power consumption and waste of conveying liquid, and were furthermore subject to clogging and loss of peas when the apparatus was stopped.

It is therefore a more specific object of the present invention, to provide an improved hydraulic conveying system adapted to effectively transport and to thoroughly wash variable quantities of soft granules such as peas or other legumes, automatically and without undesirable loss and damage to the product.

Another specific object of the invention is to provide hydraulic apparatus especially adapted for the conveyance and treatment of green peas, which is inexpensive and compact in construction, and wherein maximum quantities of the granules may be handled without injury.

A further specific object of the invention is to provide a hydraulic conveyor to which the peas may be conveniently admitted and from which the product may be effectively discharged, and wherein the transporting water may be reutilized and maintained in relatively clean condition.

These and other objects and advantages of the present improvement will be apparent from the following detailed description.

A clear conception of one embodiment of the invention, and of the mode of constructing and of operating hydraulic conveying and washing systems built in accordance therewith, may be had by referring to the drawings accompanying and forming a part of this specification wherein like reference characters designate the same or similar parts in the various views.

Figure 1:
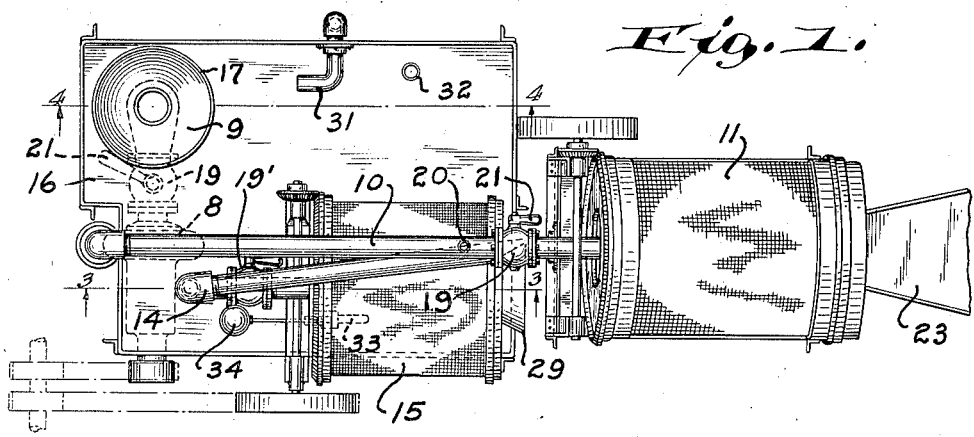
Fig. 1 is a somewhat diagrammatic plan view of one of the improved hydraulic conveying and washing systems.

While the invention has been shown and described herein as being specifically applied to a hydraulic conveyor for green peas or other legumes, having the additional function of washing the product, it is to be understood that it is not intended to restrict the scope by such specific embodiment, since the washing function may obviously be replaced by other kinds of treatments such as blanching.

Referring to the drawings, the improved hydraulic apparatus illustrated therein, comprises in general, a rotary pump 8 having an axial inlet in open communication with a supply cone or funnel 9 and a peripheral discharge communicating directly with a conveying pipe or conduit 10 of any desired length; a rotary relatively coarse screen 11 for receiving the mixture from the discharge end of the conduit 10 and for separating the peas 12 from the liquid 13; a return pipe or conduit 14 for conducting the liquid and debris from the coarse screen to a rotary relatively fine screen and separator 15; and a liquid basin or reservoir 16 for receiving the pure liquid from the separator 15 and for delivering an abundant supply of liquid to the funnel 9.

Figure 3:
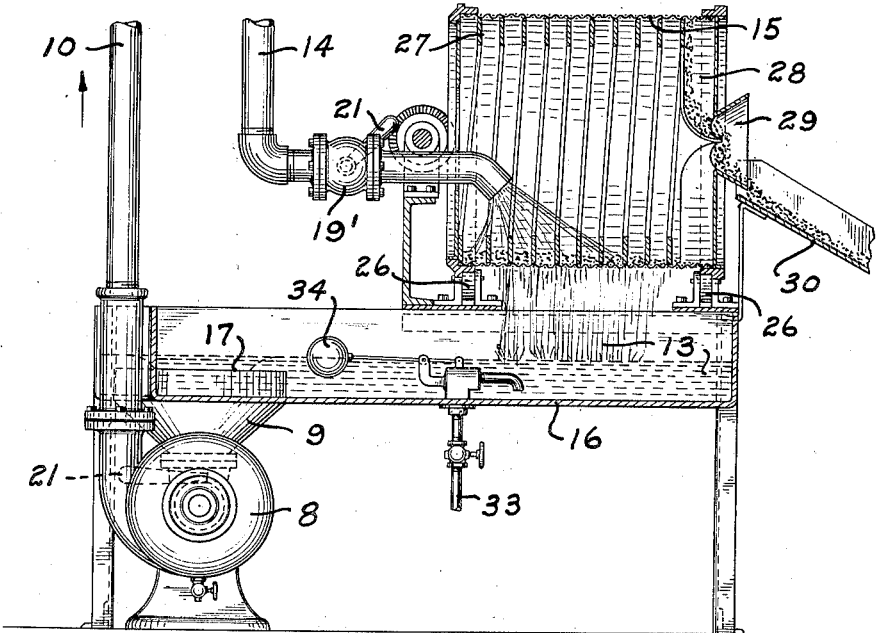
Fig. 3 is a somewhat enlarged vertical section through the apparatus, taken along the line 3—3 of Fig. 1.
Figure 4:
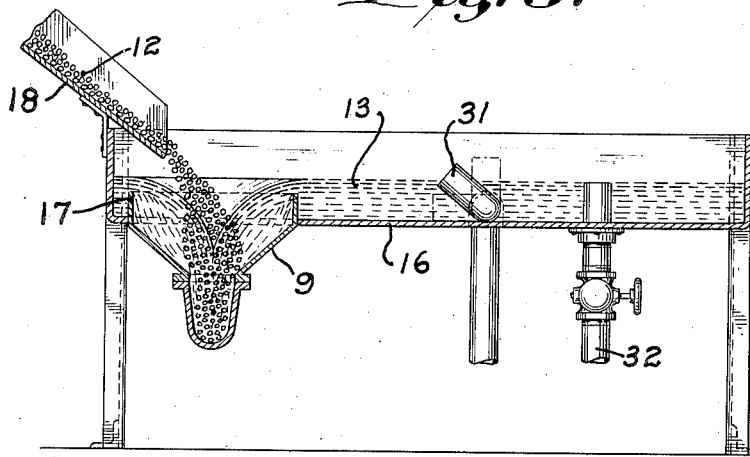
Fig. 4 is a similarly enlarged vertical section taken along the line 4—4 of Fig. 1.

The rotor of the pump 8 may be driven from any suitable source of power, and this pump is preferably of the type ordinarily employed for pumping trash; the pump rotor being provided with large, smooth and unobstructed passages adapted to prevent clogging. The axial side inlet opening of the pump 8 communicates without obstruction of any nature, with the lower end of the funnel 9 which may be of any desired length and taper, and the upper end of the funnel projects above the bottom of the reservoir 16 to provide a weir or dam 17 over which the water is adapted to flow as shown in Fig. 4, when the pump 8 is operating. The reservoir 16 may also be provided with a supply spout 18 for the green peas 12 which are to be conveyed and treated, as also indicated in Fig. 4, and this spout 18 is adapted to deliver the untreated granules into the center and considerably below the crest of the dam 17. The conveying conduit 10 may extend vertically or horizontally, or in an inclined direction, away from the peripheral discharge opening of the pump 8, and is disposed tangentially relative to the pump rotor. This conduit 10 is provided with a shut-off valve 19 adjacent to its discharge end and a similar valve 19 is provided at the suction side of the pump 8, and a valve controlled steam pipe 20 may be caused to communicate with the pump and conduit 10 intermediate the valves 19. Each valve 19 is operable by a handle 21, and when wide open, the valves 19 should entirely avoid obstruction of the flow as clearly illustrated in Fig. 5, and the mixture of water and peas is adapted to flow freely through the pump rotor and conveyor conduit as indicated by the arrows in Figs. 2 and 3.

Figure 2:
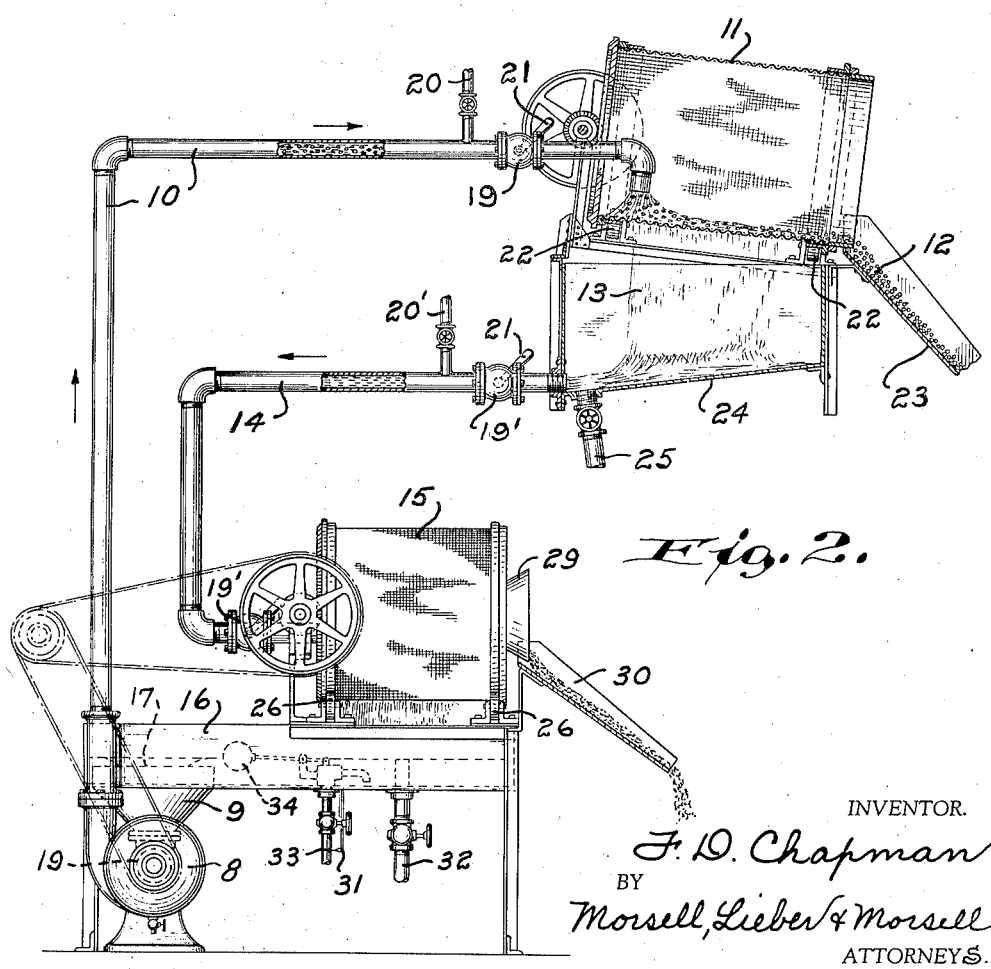
Fig. 2 is a similar part-sectional side elevation of the apparatus of Fig. 1, a central longitudinal section having been taken through the pea separating and discharge screen at the delivery end of the conveyor.

The primary coarse screen 11 comprises a revolving perforated drum mounted in an inclined position upon rollers 22, and the delivery end of the conveyor conduit 10 terminates within the upper end of the screen as disclosed in Fig. 2. The screen 11 may be revolved in any suitable manner to cause the peas 12 to roll downwardly along the lower interior thereof, while permitting the water 13 and debris to pass by gravity through the coarse screen perforations, and the lower end of the screen 11 is entirely free from obstructions so that the washed peas 12 may be delivered by gravity upon a pea discharge chute 23.

The return conduit 14 may also be provided, near its opposite ends, with shut-off valves 19', and with a steam inlet or supply pipe 20' between these valves. The upper inlet end of the conduit 14 communicates with a liquid collecting trough 24 disposed directly beneath the screen 11, and this trough 24 may be provided with a drain pipe 25 as shown in Fig. 2. The lower discharge end of the return conduit 14 terminates within the secondary fine screen 15 as illustrated in Fig. 3, and this screen comprises a perforated cylindrical drum rotatable about a horizontal axis upon supporting rollers 26, in any convenient manner. The interior of the screen 15 is provided with a helical flight 27 and with elevating vanes 28 at the delivery end of the flight. The flight 27 is adapted to convey the debris toward the vanes 28 during rotation of the drum; and the vanes are adapted to collect and to elevate the debris removed from the liquid passing through the screen perforations, and to deliver the same through a discharge cone 29 carried by the end head of the screen 15 upon a fixed discharge chute 30. The separated clean liquid 13 drops by gravity directly into the reservoir 16 disposed beneath the screen 15, and is eventually re-circulated through the system.

The liquid supply reservoir 16 has a bath of liquid therein of sufficient depth to cause an abundant flow of liquid over the dam 17 when the conveyor is operating. The depth of the liquid 13 in the bath may be varied by means of a drain having an adjustable level varying end 31 which may be set at any desired angle between horizontal and vertical position as indicated in Fig. 4, in order to fix the level of the liquid within the receptacle or reservoir 16. The reservoir 16 may also be provided with a fixed valve controlled overflow pipe 32 which cooperates with the adjustable drain 31 to maintain the desired liquid level within the reservoir 16. A fresh liquid supply pipe 33 having therein a valve the operation of which is controlled by a float 34, may also be provided for the purpose of maintaining a desirable quantity of liquid in the system, and this quantity may vary as the volume of the admitted peas changes, but the volume of the mixed peas and liquid flowing through the pump 8 and conduit 10 should preferably be substantially constant.

Figure 5:
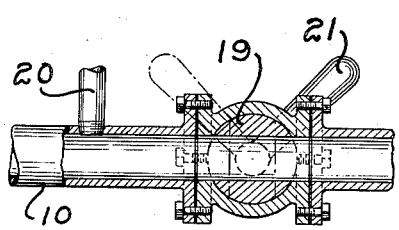
Fig. 5 is a further enlarged section through one of the valves which facilitate sterilization of the hydraulic conduits of the system.

During normal operation of the improved hydraulic apparatus, the valves 19, 19' are wide open as shown in solid lines in Fig. 5, the steam supply through the pipes 20, 20' is cut off, and the system is supplied with liquid, preferably water, as shown in the drawings. The pump 8 is operating continuously to withdraw liquid from the reservoir 16 over the dam 17 and through the funnel 9, and forces the liquid through the conveyor conduit 10; and the screens 11, 15 are also being revolved constantly upon their roller supports. As the peas 12 are admitted from the supply chute 18 into the downwardly flowing annular cataract below the crest of the dam 17, they are engulfed and immersed in the whirling liquid stream, eventually passing directly through the pump rotor and being forced through the conduit 10. During the passage of the mixture into and through the pump rotor and through the conveyor conduit at high velocity, the relatively buoyant peas seek the central portion of the stream which is devoid of frictional contact with the conduit confining wall, and crushing and injurious scraping of the relatively soft product is thereby substantially eliminated. When the mixture is ultimately delivered into the primary revolving screen 11, the peas 12 are separated from the liquid 13 and from the finer debris, and are finally discharged along the chute 23 in thoroughly cleansed condition.

The liquid 13 and the debris, separated from the peas 12 by the screen 11, flow through the trough 24 and return conduit 14 by gravity, and are subsequently deposited within the secondary screen 15 wherein the debris is removed by the flight 27, vanes 28 and cone 29, and is discharged to the chute 30. The clean liquid 13 which is separated from the debris, is returned to the reservoir 16 and is subsequently again circulated through the system by the pump 8. The drain pipe 31, after having been properly set, functions to maintain the desired level of liquid 13 in the reservoir 16, and when this liquid level drops sufficiently to produce noticeable variation in the quantity of mixture taken into the suction side of the pump 8, the float 34 automatically functions to admit fresh liquid to the system, thereby insuring substantially uniform flow through the conveyor conduit 10. It will thus be noted that the improved apparatus normally functions to automatically transport the peas and to simultaneously wash them, and delivers the final product to any desired point for further treatment.

If it becomes desirable to clean and sterilize the apparatus, the pump 8 and screens 11, 15 may be stopped, whereupon the liquid may be drained from the system by opening a drain cock ordinarily provided on the trash pump, and by shifting the drain pipe end 31 to horizontal position adjacent to the bottom of the reservoir 16. The shut-off valves 19, 19' may then be closed, whereupon steam may be admitted through the pipes 20, 20' to the interiors of the pump 8 and conduits 10, 14, thus effecting throrough sterilization and cleansing. When the steam supply is cut off, and the valves 19, 19' are again reopened, a quantity of fresh liquid may run through the system for washing purposes, before peas are again admitted. This feature of providing means for effectively sterilizing both the internal passages of the pump and of the conduits, is extremely important.

From the foregoing detailed description it will be apparent that the present invention provides simple, compact, and highly efficient apparatus for hydraulically transporting granular material such as green peas, and for simultaneously washing the product during the transportation thereof. The peas are conveyed constantly and without danger of damaging the product, in spite of tne fact that the granules pass directly through the pump 8 during transportation thereof from one locality to another. The control mechanism insures substantially constant supplying of peas and liquid to the inlet side of the pump 8, and a maximum quantity of peas can be transported and treated with the aid of a minimum quantity of liquid. The admission of the peas to the liquid below the crest of the dam 17 is also important since peas are thereby prevented from entering the basin within the reservoir 16; and when the apparatus is stopped, the buoyant peas float from within the pump passages and rise within the funnel 9 from whence they may be removed, and the pump is thus left clear for subsequent operation. The primary screen 11 serves to effectively separate the liquid and debris from the peas, while the secondary screen 15 likewise serves to effectively remove the debris from the liquid and to return the latter to the reservoir 16 in relatively clean condition. The entire apparatus may be readily maintained in clean and sanitary condition, and requires no attendants after once having been placed in operation. The improved hydraulic apparatus has proven highly successful in actual commercial use, especially for the transportation and treatment of green peas, but may obviously be utilized for other analogous purposes.

It should be understood that it is not desired to limit the present invention to the exact details of the construction, and to the precise mode of operation herein shown and described, for various modifications within the scope of the claims may occur to persons skilled in the art.

It is claimed and desired to secure by Letters Patent:—

1. A hydraulic system comprising, a conveyor conduit, a constant capacity pump for delivering a mixture of liquid and peas to said conduit, means providing an annular dam for delivering the mixture to the inlet side of said pump, means for delivering peas within said dam below the crest thereof, a liquid reservoir for delivering liquid over said dam, and means for automatically controlling the quantity of liquid in said reservoir so as to vary the quantity of liquid delivered over said dam inversely with respect to variations in the quantity of admitted peas in order to maintain the volume of the mixture substantially constant.

2. A hydraulic system comprising, a conveyor conduit, a pump for delivering a mixture of liquid and peas to said conduit, means providing an annular dam for delivering the mixture to said pump, means for delivering peas within said dam, a liquid reservoir for delivering liquid over said dam, an adjustable drain for varying the level of the liquid within said reservoir, and fresh liquid admission means operable by variations in the level of the liquid within said reservoir.

3. A hydraulic system comprising, a conveyor conduit, a pump communicating with an end of said conduit, a screen for removing solids from liquid delivered from the opposite end of said conduit, a funnel for delivering the separated liquid to said pump in the form of an annular cataract, means for delivering solids centrally into the liquid cataract, and means for varying the quantity of liquid so as to maintain the volume of admitted mixture substantially constant.

4. A hydraulic system comprising, a conveyor conduit, a pump for delivering a mixture of liquid and legumes to said conduit, means providing a liquid supply basin of relatively large capacity in advance of said pump, means providing a continuous crest over which liquid from said basin is delivered to the inlet of said pump, and means for delivering legumes to the liquid entering said pump within said crest, said basin being of sufficient size to prevent extreme variations in the liquid level therein due to maximum variations in the quantity of legumes admitted to said pump.

5. A hydraulic system comprising, a conveyor conduit, a constant capacity pump for delivering a mixture of liquid and legumes to said conduit, means providing a liquid supply basin of relatively large capacity above said pump, means providing an annular crest over which liquid from said basin is delivered by gravity to the inlet of said pump, and means for delivering legumes by gravity to the liquid entering said pump within said crest, said basin being of sufficient size to prevent extreme variations in the liquid level therein due to maximum variations in the quantity of legumes admitted to said pump.

6. A hydraulic system comprising, a conveyor conduit, a pump within said conduit for urging a mixture of liquid and legumes therethrough, a relatively extensive liquid supply basin in advance of said pump, means providing a continuous baffle for delivering liquid from said basin toward a central axis and from thence into said pump, and means for delivering legumes to the liquid passing said baffle, the surface area of said basin being sufficiently extensive to prevent extreme variations in liquid level due to variations in the quantity of legumes delivered within said baffle.

7. A hydraulic system comprising, a conveyor conduit, a pump within said conduit for urging a mixture of liquid and legumes therethrough, a liquid supply basin above said pump, a downwardly converging funnel interposed between said basin and the inlet of said pump, an annular baffle extending upwardly from the larger end of said funnel into said basin, and means for delivering legumes into the liquid passing said baffle and flowing toward said pump.

FRANK D. CHAPMAN.